(12) United States Patent
Jeong et al.

(10) Patent No.: US 11,511,717 B2
(45) Date of Patent: Nov. 29, 2022

(54) ELECTRONIC BRAKE SYSTEM AND METHOD FOR OPERATING THE SAME

(71) Applicant: MANDO CORPORATION, Gyeonggi-do (KR)

(72) Inventors: Hyojin Jeong, Gyeonggi-do (KR); Seong Ho Choi, Gyeonggi-do (KR); Jin Seok Kim, Gyeonggi-do (KR); Byung Ki Kim, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 829 days.

(21) Appl. No.: 16/395,233

(22) Filed: Apr. 26, 2019

(65) Prior Publication Data
US 2019/0329749 A1  Oct. 31, 2019

(30) Foreign Application Priority Data

Apr. 26, 2018 (KR) .................. 10-2018-0048456
Apr. 26, 2018 (KR) .................. 10-2018-0048461
May 30, 2018 (KR) .................. 10-2018-0061882

(51) Int. Cl.
*B60T 13/66* (2006.01)
*B60T 13/68* (2006.01)
(Continued)

(52) U.S. Cl.
CPC .......... *B60T 13/662* (2013.01); *B60T 8/1755* (2013.01); *B60T 8/4081* (2013.01); *B60T 13/686* (2013.01); *B60T 13/745* (2013.01); *B60T 15/028* (2013.01)

(58) Field of Classification Search
CPC .... B60T 13/662; B60T 8/1755; B60T 8/4081; B60T 13/686; B60T 13/745; B60T 15/028
See application file for complete search history.

(56) References Cited

U.S. PATENT DOCUMENTS

2004/0004392 A1*  1/2004  Kusano ................. B60T 13/148
                                                       303/114.1
2013/0213023 A1   8/2013  Eckstein et al.
(Continued)

FOREIGN PATENT DOCUMENTS

DE       10152763       7/2003
EP       2 520 473      11/2012
(Continued)

OTHER PUBLICATIONS

Extended European Search Report dated Sep. 6, 2019 for European Application No. 19171275.1.

*Primary Examiner* — Fadey S. Jabr
*Assistant Examiner* — Naeem Taslim Alam
(74) *Attorney, Agent, or Firm* — Ladas & Parry, LLP

(57) ABSTRACT

An electronic brake system and a method for operating the same are disclosed. The electronic brake system includes an integrated master cylinder, a hydraulic-pressure supply device, and a hydraulic control unit. The integrated master cylinder allows a pressing medium to be discharged based on displacement of a brake pedal and at the same time provides proper pedal feel for the user. The hydraulic control unit controls hydraulic pressure of a pressing medium supplied to respective wheel cylinders. The electronic brake system operates in different ways according to a normal operation mode and an abnormal operation mode.

13 Claims, 6 Drawing Sheets

(51) Int. Cl.
   *B60T 13/74* (2006.01)
   *B60T 15/02* (2006.01)
   *B60T 8/1755* (2006.01)
   *B60T 8/40* (2006.01)

(56) References Cited

U.S. PATENT DOCUMENTS

| | | |
|---|---|---|
| 2013/0213025 A1 | 8/2013 | Linden |
| 2015/0035353 A1 | 2/2015 | Drumm |
| 2015/0097418 A1* | 4/2015 | Koo .................. B60T 11/20 303/14 |
| 2015/0166028 A1* | 6/2015 | Kim .................. B60T 8/4081 303/10 |
| 2017/0106846 A1* | 4/2017 | Kim .................. B60T 11/232 |

FOREIGN PATENT DOCUMENTS

| | | |
|---|---|---|
| EP | 2 641 788 | 9/2013 |
| JP | 2008-265450 | 11/2008 |
| JP | 2010-126037 | 6/2010 |
| JP | 2010-137617 | 6/2010 |
| JP | 5126039 | 1/2013 |
| KR | 10-2015-0055644 | 5/2015 |

\* cited by examiner

ELECTRONIC BRAKE SYSTEM AND METHOD FOR OPERATING THE SAME

CROSS-REFERENCE TO RELATED APPLICATION

This application is based on and claims priority under 35 U.S.C. § 119 to Korean Patent Application No. 10-2018-0048456, filed on Apr. 26, 2018, Korean Patent Application No. 10-2018-0048461, filed on Apr. 26, 2018, and Korean Patent Application No. 10-2018-0061882, filed on May 30, 2018 in the Korean Intellectual Property Office, the disclosures of which are incorporated herein by reference in their entireties.

BACKGROUND

1. Field

Embodiments of the present disclosure relate to an electronic brake system and a method for operating the same, and more particularly to an electronic brake system for generating braking force using an electrical signal corresponding to a displacement of a brake pedal, and a method for operating the same.

2. Description of the Related Art

A brake system for braking of a vehicle is essentially mounted to a vehicle, and various systems have recently been proposed to obtain stronger and more stable braking force.

Examples of brake systems include anti-lock brake systems (ABSs) to prevent slippage of wheels during braking, brake traction control systems (BTCSs) to prevent slippage of driving wheels during sudden unintended acceleration from a stop or upon rapid acceleration of a vehicle, and electronic stability control systems (ESCs) to stably maintain a driving state of vehicles by controlling a brake hydraulic pressure through combination of an anti-lock brake (ABS) system with a brake traction control system.

Conventionally, when a driver depresses a brake pedal, a conventional brake system is designed to supply hydraulic pressure needed for braking to wheel cylinders using a booster mechanically connected to the brake pedal. An electronic brake system provided with a hydraulic-pressure supply device has recently been developed and rapidly come into widespread use. Once a driver pushes a brake pedal, the hydraulic-pressure supply device of the electronic brake system senses a displacement of the brake pedal through a pedal displacement sensor, and receives an electric signal indicating the driver's braking intention from the pedal displacement sensor, such that hydraulic pressure needed for braking is supplied to wheel cylinders.

CITED REFERENCE

Patent Document

European Registered Patent No. EP 2 520 473 A1 (Honda Motor Co., Ltd.), (Nov. 7, 2012)

SUMMARY

Therefore, it is an aspect of the present disclosure to provide an electronic brake system for integrating a master cylinder and a simulation device into one body to reduce the number of constituent components, resulting in implementation of a product having a smaller size and a lighter weight, and a method for operating the same.

It is another aspect of the present disclosure to provide an electronic brake system for efficiently braking a vehicle in various driving situations, and a method for operating the same.

It is another aspect of the present disclosure to provide an electronic brake system for stably generating high brake pressure, and a method for operating the same.

It is another aspect of the present disclosure to provide an electronic brake system for improving performance and operational stability of a product, and a method for operating the same.

It is another aspect of the present disclosure to provide an electronic brake system for improving durability of a product by reducing load applied to constituent components of the product, and a method for operating the same.

It is another aspect of the present disclosure to provide an electronic brake system for improving ease of assembly and productivity of a product, resulting in reduction in product costs, and a method for operating the same.

Additional aspects of the disclosure will be set forth in part in the description which follows and, in part, will be obvious from the description, or may be learned by practice of the disclosure.

In accordance with an aspect of the present disclosure, an electronic brake system may include a reservoir configured to store a pressing medium therein, an integrated master cylinder configured to include a master chamber, a master piston provided in the master chamber to produce displacement changeable by movement of a brake pedal, a simulation chamber, a reaction force piston provided in the simulation chamber to produce displacement changeable by hydraulic pressure of the pressing medium stored in the master chamber, and an elastic member elastically supporting the reaction force spring, a hydraulic-pressure supply device configured to generate hydraulic pressure by operating a hydraulic piston by an electrical signal that is output in response to displacement of the brake pedal, and a hydraulic control unit configured to include not only a first hydraulic circuit to control hydraulic pressure applied to two wheel cylinders, but also a second hydraulic circuit to control hydraulic pressure applied to two other wheel cylinders.

The integrated master cylinder may include a simulation passage configured to connect the simulation chamber and the reservoir to each other, and a simulator valve provided in the simulation passage to control flow of a pressing medium.

The integrated master cylinder may further include a cylinder body in which the master chamber and the simulation chamber are formed, wherein the master chamber and the simulation chamber are sequentially disposed in a direction from an inlet of the cylinder body connected to the brake pedal to an inner end of the cylinder body.

The integrated master cylinder may further include a support member provided at an inner end of the cylinder body so as to elastically support the elastic member.

Each of the reaction force piston and the support member may include a receiving groove formed to be recessed in a manner that at least some parts of the elastic member are seated therein.

The integrated master cylinder may further include a bypass passage connected parallel to the simulator valve on the simulation passage, and a simulator check valve provided in the bypass passage so as to allow a pressing medium to flow in only one direction from the reservoir to the simulation chamber.

The electronic brake system may further include a first backup passage configured to connect the master chamber to the first hydraulic circuit, a second backup passage configured to connect the simulation chamber to the second hydraulic circuit, a first cut valve provided in the first backup passage so as to control flow of a pressing medium, and at least one second cut valve provided in the second backup passage so as to control flow of a pressing medium.

The hydraulic-pressure supply device may include a first pressure chamber provided at one side of the hydraulic piston movably disposed in a cylinder block and connected to at least one wheel cylinder, and a second pressure chamber provided at another side of the hydraulic piston and connected to at least one wheel cylinder. The hydraulic control unit may include a first hydraulic passage connected to the first pressure chamber, a second hydraulic passage connected to the second pressure chamber, and a third hydraulic passage through which the first hydraulic passage and the second hydraulic passage are linked to each other and then branched into a plurality of passages to be respectively connected to the first hydraulic circuit and the second hydraulic circuit.

The hydraulic control unit may further include a first valve provided in the first hydraulic passage so as to control flow of a pressing medium, a fifth hydraulic passage branched from a position between the first pressure chamber and the first valve on the first hydraulic passage, and connected to the second hydraulic passage, and a second valve provided in the fifth hydraulic passage to control flow of a pressing medium.

The first valve may be provided as a check valve allowing only flow of a pressing medium discharged from the first pressure chamber, and the second valve may be provided as a solenoid valve controlling bidirectional flow of a pressing medium.

The electronic brake system may further include a pedal displacement sensor configured to sense displacement of the brake pedal, and an electronic control unit (ECU) configured to control operation of the valve based on hydraulic pressure information and displacement information of the brake pedal.

The first hydraulic circuit may include a first inlet valve and a second inlet valve configured to respectively control hydraulic pressure supplied to a first wheel cylinder and hydraulic pressure applied to a second wheel cylinder, and a first outlet valve and a second outlet valve configured to respectively control hydraulic pressure flowing from the first wheel cylinder to the reservoir and hydraulic pressure flowing from the second wheel cylinder to the reservoir. The second hydraulic circuit may include a first inlet valve and a fourth inlet valve configured to respectively control hydraulic pressure supplied to a third wheel cylinder and hydraulic pressure supplied to a fourth wheel cylinder. The second backup passage may be provided to connect at least one of downstream sides of the third and fourth inlet valves to the simulation chamber.

The simulation passage may be provided to be branched from a position between the simulation chamber and the second cut valve on the second backup passage.

In accordance with another aspect of the present disclosure, a method for operating the electronic brake system includes performing a normal operation mode. The normal operation mode includes sealing the master chamber by closing the first cut valve, and allowing the simulation chamber to communicate with the reservoir by closing the second cut valve and opening the simulator valve. Thus, the reaction force piston compresses the elastic member by operation of the brake pedal and elastic restoring force of the elastic member is provided for better pedal feel of a driver.

In accordance with another aspect of the present disclosure, a method for operating the electronic brake system includes performing an abnormal operation mode. The abnormal operation mode includes opening the first cut valve to allow the master chamber to communicate with the first hydraulic circuit, and allowing the simulation chamber to communicate with the second hydraulic circuit by closing the simulator valve and opening the second cut valve. Thus, a pressing medium stored in the master chamber is provided to the first hydraulic circuit through the first backup passage according to a pedal effort of the brake pedal, and a pressing medium of the simulation chamber is provided to the second hydraulic circuit through the second backup passage.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
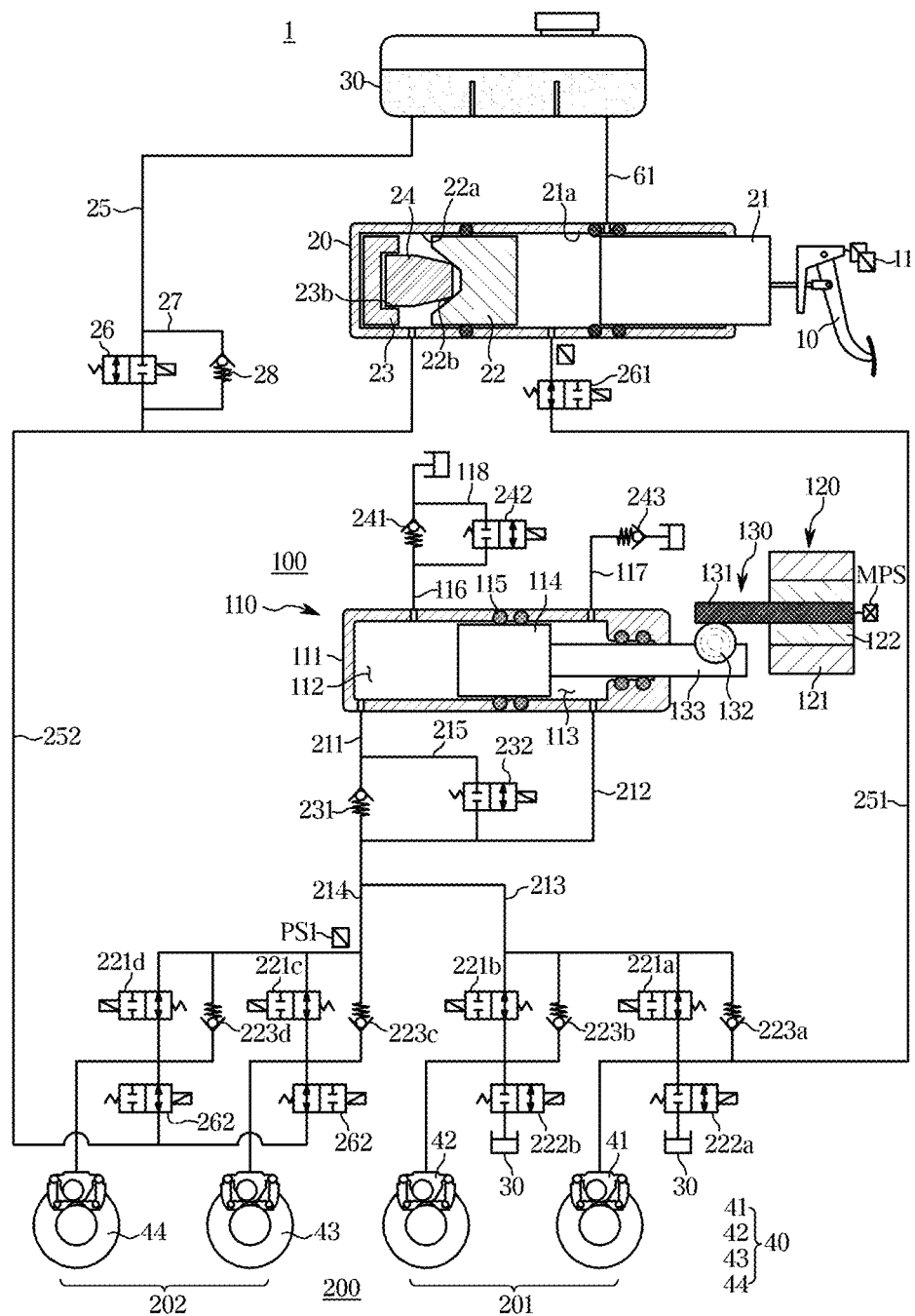
FIG. 1 is a hydraulic circuit diagram illustrating an electronic brake system according to an embodiment of the present disclosure.

Reference will now be made in detail to the embodiments of the present disclosure, examples of which are illustrated in the accompanying drawings. The embodiments to be described below are provided to fully convey the spirit of the present disclosure to a person skilled in the art. The present disclosure is not limited to the embodiments disclosed herein and may be implemented in other forms. In the drawings, some portions not related to the description will be omitted and will not be shown in order to clearly describe the present disclosure, and also the size of the component may be exaggerated or reduced for convenience and clarity of description.

FIG. 1 is a hydraulic circuit diagram illustrating an electronic brake system 1 according to an embodiment of the present disclosure.

Referring to FIG. 1, the electronic brake system 1 may include an integrated master cylinder 20 to pressurize and discharge a pressing medium (e.g., brake fluid) included therein according to a pedal effort of a brake pedal 10 depressed by a driver of a vehicle as well as to provide the driver with reaction force corresponding to a pedal effort of the brake pedal 10, a reservoir 30 formed to communicate with the integrated master cylinder 20 to store the pressing medium, one or more wheel cylinders 40 to perform braking of respective wheels RR, RL, FR, and FL upon receiving hydraulic pressure generated by the pressing medium, a hydraulic-pressure supply device 100 to generate hydraulic pressure of a pressing medium by mechanically operating upon receiving an electric signal indicating the driver's braking intention from a pedal displacement sensor 11 sensing displacement of the brake pedal 10, a hydraulic control unit to control hydraulic pressure applied to the wheel cylinders 40, and an electronic control unit (ECU) (not shown) to control the hydraulic-pressure supply device 100 and various valves based on hydraulic pressure information and pedal displacement information.

The integrated master cylinder 20 may be configured to have a master chamber 21a and a simulation chamber 22a to pressurize and discharge the pressing medium provided therein, and provide the driver with reaction force corresponding to a pedal effort of the brake pedal 10.

The integrated master cylinder 20 may include a master cylinder connected to a first hydraulic circuit 201 (to be described later), and a pedal simulator connected to a second hydraulic circuit (to be described later) to provide proper pedal feel for a driver. The master cylinder and the pedal simulator may be sequentially disposed in the direction from the brake pedal 10 to an inner end of the integrated master cylinder 20, and may be coaxially arranged in one cylinder body.

In more detail, the integrated master cylinder 20 may include a cylinder body provided with chambers 21a and 22a disposed therein to form a body. The integrated master cylinder may include a master chamber 21a, a master piston 21 provided in the master chamber 21a and movable by operation of the brake pedal 10, a restoring spring (not shown) to elastically support the master piston 21, a simulation chamber 22a, a reaction force piston 22 provided in the simulation chamber 22a to form a displacement changeable by hydraulic pressure of a pressing medium stored in the master chamber 21a, an elastic member 24 to elastically support the reaction force piston 22, a support member 23 provided in an inner end of the cylinder body to support the elastic member 24, a simulation passage 25 through which the simulation chamber 22a communicates with a reservoir 30, a simulator valve 26 provided in the simulation passage 25 to control flow of the pressing medium, a bypass passage 27 connected to the simulation passage 25 by bypassing the simulator valve 26, and a simulator check valve provided in the bypass passage 27 to control flow of the pressing medium.

The master chamber 21a may include the master piston 21 connected to an input rod. The simulation chamber 22a may include the reaction force piston 22, the elastic member 24, and the support member 23. The master chamber 21a and the simulation chamber 22a may be sequentially disposed in a cylinder body of the integrated master cylinder 20 in the direction from an inlet connected to the brake pedal to an inner end of the cylinder body.

The master chamber 21a and the simulation chamber 22a may communicate with a hydraulic port through which a pressing medium (i.e., fluid) is input and output. In more detail, two hydraulic ports communicating with the master chamber 21a may be respectively connected to the reservoir passage 61 and a first backup passage 251, and the simulation chamber 22a may be connected to a second backup passage 252 (to be described later) through the hydraulic port.

Meanwhile, the integrated master cylinder 20 according to an embodiment of the present disclosure may include the master chamber 21a and the simulation chamber 22a, such that the integrated master cylinder 20 may secure safety in the event of malfunction. For example, the master chamber 21a may be connected to two wheels selected among from among a front right wheel FR, a front left wheel FL, a rear left wheel RL and a rear right wheel RR, and the simulation chamber 22a may be connected to the remaining two wheels other than the selected wheels, such that braking of the vehicle remains possible even when one of the master chamber 21a and the simulation chamber 22a malfunctions. For example, the master chamber 21a may be connected to first and second wheel cylinders 41 and 42, and the simulation chamber 22a may be connected to third and fourth wheel cylinders 43 and 44.

The master piston 21 of the integrated master cylinder 20 may be elastically supported by a restoring spring (not shown). The restoring spring may be compressed by the master piston that moves in response to change in displacement of the brake pedal 10 depressed by the driver. When the driver takes his or her foot off the brake pedal 10 to release the pedal effort applied to the brake pedal 10, the restoring spring may be expanded by elastic force, such that the master piston 21 can move back to an original position thereof.

The master chamber 21a may be connected to the reservoir 30 through the reservoir passage 61, and the simulation chamber 22a may be connected to the reservoir 30 through the simulation passage 25. The reservoir passage 61 may be provided with a reservoir check valve (not shown) that allows a pressing medium to flow from the reservoir 30 to the master chamber 21a and prevents the pressing medium from flowing from the master chamber 21a to the reservoir 30. In another example, the master chamber 21a may use a sealing member (to be described later) without using such a reservoir check valve, such that the master chamber 21a can allow only flow of a pressing medium from the reservoir 30 to the master chamber 21a and prevent the pressing medium from flowing from the master chamber 21a to the reservoir 30 using the sealing member.

The simulation passage 25 may be branched from a second backup passage connected to the simulation chamber 22a, and may be connected to the reservoir 30. The simulation passage 25 may be provided with a simulator valve 26 that controls a simulation operation of the brake pedal by controlling flow of the pressing medium.

The reaction force piston 22 may be installed to have a predetermined range of displacement within the simulation chamber 22a by hydraulic pressure of the pressing medium pressed by the master chamber 21a. The elastic member 24 may be provided between the reaction force piston 22 and the support member 23 to elastically support the reaction force piston 22, such that the elastic member 24 may be compressively deformed by displacement of the reaction force piston 22. The elastic member 24 may be formed of a material such as rubber that can be compressed or expanded by displacement of the reaction force piston 22.

In order to stably compress or restore the elastic member 24, a receiving groove 22b in which at least a part of the elastic member 24 is seated may be recessed at a surface (e.g., a left side surface when viewed from FIG. 1) where the reaction force piston 22 faces the elastic member 24, such that the elastic member 24 can be stably compressed or restored. Likewise, a receiving groove 23b in which at least a part of the elastic member 24 is seated may also be recessed at a surface (e.g., a right side surface when viewed from FIG. 1) where the support member 23 faces the elastic member 24.

The simulation passage 25 may allow the simulation chamber 22a and the reservoir 30 to communicate with each other, and may be provided with the simulator valve 26 controlling flow of the pressing medium. The simulator valve 26 may be implemented as a normally closed (NC) solenoid valve that remains closed in a normal state and is then open upon receiving an electric signal from an electronic control unit (ECU). The simulation passage 25 may be provided with the bypass passage 27 that is connected parallel to the simulator valve 26. The bypass passage 27 may be provided with a simulator check valve 28 that allows the pressing medium to flow only in one direction. The simulator check valve 28 allows only flow of the pressing medium from the reservoir 30, and prevents the pressing medium from flowing into the reservoir 30.

A detailed description of the pedal simulation operation by the integrated master cylinder 20 is as follows. In a normal operation mode, when a pedal effort is applied to the brake pedal 10 by the driver of the vehicle, a first cut valve 261 provided in the first backup passage 251 to be described later is closed, a second cut valve 262 provided in the second backup passage 262 is also closed, and the simulator valve 26 provided in the simulation passage 26 is open. The master piston 21 may move in response to displacement of the brake pedal in a manner that the pressing medium is pressurized in the master chamber 21a, and hydraulic pressure of the pressed pressing medium may be transmitted in a forward direction (e.g., a right side surface of the reaction force piston when viewed from FIG. 1), resulting in formation of displacement in the reaction force piston 22. The elastic member 24 may be compressed by such displacement of the reaction force piston 22, and elastic restoring force may occur by such compression of the elastic member 24, resulting in formation of proper pedal feel for the driver.

In this case, since the master chamber 21a is sealed, displacement of the reaction force piston 22 may occur by hydraulic pressure of the pressing medium that is pressurized in the master chamber 21a by displacement of the master piston 21. Since the simulator valve 26 is open, the pressing medium stored in the simulation chamber 22a is transmitted to the reservoir 30 through the simulation passage 25, such that the elastic member 24 is compressed. Thereafter, when the driver takes a foot off the brake pedal 10 to release the pedal effort applied to the brake pedal 10, a restoring spring (not shown) and the elastic member 24 may be expanded by elastic force such that the reaction force piston 22 and the master piston 21 can move back to original positions thereof. The simulation chamber 22a may receive the pressing medium through the simulation passage 25 and the bypass passage 27, and may be filled with the received pressing medium.

As described above, the master chamber 21a and the simulation chamber 22a are always filled with the pressing medium. Therefore, frictional force of the master piston 21 and the reaction force piston 22 is minimized during operation of the brake pedal, such that durability of the integrated master cylinder 20 can be improved and foreign materials from the outside can be prevented from flowing into the integrated master cylinder 20.

Meanwhile, when the electronic brake system 1 abnormally operates, i.e., when the electronic brake system 1 operates in a fallback mode, the integrated master cylinder 20 may operate as follows, and a detailed description thereof will hereinafter be given with reference to FIG. 6.

Meanwhile, several reservoirs 30 may be shown in the drawings, and the respective reservoirs 30 may be denoted by the same reference number. However, the reservoirs 30 may be implemented as the same or different components.

The hydraulic-pressure supply device 100 may mechanically operate by receiving an electrical signal indicating the driver's braking intention from a pedal displacement sensor 11 sensing displacement of the brake pedal 10, such that hydraulic pressure caused by the pressing medium may occur.

The hydraulic-pressure supply device 100 may include a hydraulic-pressure providing unit 110 to supply pressing-medium pressure to wheel cylinders 40, a motor 120 to produce rotational force according to an electrical signal from the pedal displacement sensor 11, and a power switching unit 130 to convert rotational motion of the motor 120 into rectilinear motion and to provide the rectilinear motion to the hydraulic-pressure providing unit 110. In this case, the hydraulic-pressure providing unit 110 may also operate by pressure supplied from a high-pressure accumulator, instead of using driving force supplied from the motor 120.

The hydraulic-pressure providing unit 110 may include a cylinder block 111, a hydraulic piston 114, one or more sealing members 115, and a drive shaft 133. The cylinder block 111 may have a pressure chamber to store a pressing medium supplied thereto. The hydraulic piston 114 may be provided in the cylinder block 111. The sealing member 115 may be disposed between the hydraulic piston 114 and the cylinder block 111 to seal the pressure chamber. The drive shaft 133 may transfer power from the power switching unit 130 to the hydraulic piston 114.

The pressure chamber may include a first pressure chamber 112 located at a front side (i.e., a forward direction, see a left side of the hydraulic piston in FIG. 1) of the hydraulic piston 114, and a second pressure chamber 113 located at a rear side (i.e., a backward direction, see a right side of the hydraulic piston in FIG. 1) of the hydraulic piston 114. That is, the first pressure chamber 112 may be divided by the cylinder block 111 and the front end of the hydraulic piston 114, and may have a volume changeable according to movement of the hydraulic piston 114. The second pressure chamber 113 may be divided by the cylinder block 111 and the rear end of hydraulic piston 114, and may have a volume changeable according to movement of the hydraulic piston 114.

The first pressure chamber 112 may be connected to a first hydraulic passage 211 through a communication hole formed at the cylinder block 111. The second pressure chamber 113 may be connected to a second hydraulic passage 212 through a communication hole formed at the cylinder block 111.

The sealing member may include a piston sealing member 115 and a drive-shaft sealing member. The piston sealing member 115 may be disposed between the hydraulic piston 114 and the cylinder block 111 to seal a gap between the first pressure chamber 112 and the second pressure chamber 113. The drive-shaft sealing member (not shown) may be disposed between the drive shaft 133 and the cylinder block 111 to seal a gap between the second pressure chamber 113 and the opening of the cylinder block 111. Hydraulic pressure or negative pressure of the first and second pressure chambers 112 and 113 affected by forward or backward movement of the hydraulic piston 114 may be blocked by the piston sealing member 115, so that the resultant hydraulic pressure or negative pressure of the first and second pressure chambers 112 and 113 can be transmitted to the first hydraulic passage 211 without leaking to the second pressure chamber 113. Hydraulic pressure or negative pressure of the second pressure chamber 113 affected by forward or backward movement of the hydraulic piston 114 may be blocked by the drive-shaft sealing member, so that the resultant hydraulic pressure or negative pressure of the second pressure chamber 113 may not leak to the outside of the cylinder block 111.

The first pressure chamber 112 may be connected to the reservoir 30 through the first dump passage 116, such that the first pressure chamber 112 may receive a pressing medium from the reservoir 30 and store the received pressing medium or may transmit the pressing medium of the first pressure chamber 112 to the reservoir 30. The second pressure chamber 113 may be connected to the reservoir 30 through the second dump passage 117, such that the second pressure chamber 113 may receive a pressing medium from the reservoir 30 and store the received pressing medium or may transmit the pressing medium of the second pressure chamber 113 to the reservoir 30. To this end, the first dump passage 116 may communicate with the first pressure chamber 112 through a communication hole formed in the cylinder block 111, and may be connected to the reservoir 30. The second dump passage 117 may communicate with the second pressure chamber 113 through a communication hole formed in the cylinder block 111, and may be connected to the reservoir 30.

The motor 120 may produce driving force according to an electric signal from the ECU. The motor 120 may include a stator 121 and a rotor 122, and may rotate in a forward or backward direction using the stator 121 and the rotor 122, such that the motor 120 may produce power or force through which displacement of the hydraulic piston 114 occurs. A rotational angular speed and a rotation angle of the motor 120 may be precisely controlled by a motor control sensor (MPS). The motor 120 is well known to those skilled in the art, and as such a detailed description thereof will herein be omitted for convenience of description.

The power switching unit 130 may convert rotational force of the motor 120 into rectilinear movement. For example, the power switching unit 130 may include a worm shaft 131, a worm wheel 132, and a drive shaft 133.

The worm shaft 131 may be integrated with a rotational shaft of the motor 120. At least one worm may be formed at the outer circumference of the worm shaft 131 in a manner that the worm shaft 131 is meshed with the worm wheel 132 so that the worm wheel 132 can rotate. The worm wheel 132 may be meshed with the drive shaft 133 so that the drive shaft 133 performs rectilinear motion. The drive shaft 133 is connected to the hydraulic piston 114, such that the hydraulic piston 114 may slidably move within the cylinder block 111.

In more detail, a signal sensed by the pedal displacement sensor 11 due to displacement of the brake pedal 10 may be transmitted to the ECU, and the ECU may operate the motor 120 in one direction so that the worm shaft 131 may also rotate in one direction. Rotational force of the worm shaft 131 may be transmitted to the drive shaft 133 through the worm wheel 132, and the hydraulic piston 114 connected to the drive shaft 133 moves forward, so that hydraulic pressure may occur in the first pressure chamber 112.

In contrast, when a pedal effort is removed from the brake pedal 10, the ECU may operate the motor 120 so that the worm shaft 131 may rotate in the opposite direction. Accordingly, the worm wheel 132 may also rotate in the opposite direction, and the hydraulic piston 114 connected to the drive shaft 133 moves backward, thereby generating negative pressure in the first pressure chamber 112.

Hydraulic pressure and negative pressure may also occur in other directions opposite to the above-mentioned directions as necessary. In other words, a signal sensed by the pedal displacement sensor 11 due to displacement of the brake pedal 10 may be transmitted to the ECU, and the ECU may operate the motor 120 in an opposite direction so that the worm shaft 131 may also rotate in the opposite direction. Rotational force of the worm shaft 131 may be transmitted to the drive shaft 133 through the worm wheel 132, and the hydraulic piston 114 connected to the drive shaft 133 moves backward, so that hydraulic pressure may occur in the second pressure chamber 113.

In contrast, when a pedal effort is removed from the brake pedal 10, the ECU may operate the motor 120 in one direction so that the worm shaft 131 may also rotate in one direction. Accordingly, the worm wheel 132 may also rotate in the opposite direction, and the hydraulic piston 114 connected to the drive shaft 133 moves forward, thereby generating negative pressure in the second pressure chamber 113.

As described above, according to a rotation direction of the worm shaft 131 affected by driving of the motor 120, hydraulic pressure may occur in the first pressure chamber 112 or negative pressure may occur in the second pressure chamber 113. Information as to whether to brake the vehicle using hydraulic pressure or information as to whether to release braking using negative pressure may be determined by controlling several valves. A detailed description thereof will hereinafter be given.

Although not shown in the drawings, the power switching unit 130 may also be formed of a ball-screw-nut assembly. For example, the power switching unit 130 may include a screw that is integrated with a rotational shaft of the motor 120 or rotates with the rotational shaft of the motor 120, and a ball nut that is screw-coupled to the screw in a restricted rotation state and performs rectilinear motion according to rotation of the screw. The above-mentioned ball-screw-nut assembly is well known to those skilled in the art, and as such a detailed description thereof will herein be omitted. In addition, the power switching unit 130 may be implemented not only as the ball-screw-nut assembly, but also as any structure capable of converting rotational force into rectilinear motion without departing from the scope and spirit of the present disclosure.

The hydraulic control unit 200 may include a plurality of hydraulic passages and valves to control not only hydraulic pressure of a pressing medium applied to wheel cylinders 4, but also flow of the pressing medium, and the ECU may be provided to control the hydraulic-pressure supply device 100 and various valves based on hydraulic pressure information and pedal displacement information.

The hydraulic control unit 200 may include a first hydraulic circuit 201 to control flow of hydraulic pressure applied to first and second wheel cylinders 41 and 42, and a second hydraulic circuit 202 to control flow of hydraulic pressure applied to third and fourth cylinders 43 and 44. The hydraulic control unit 200 may further include the integrated master cylinder 20, and a plurality of flow passages and a plurality of valves to control hydraulic pressure flowing from the hydraulic-pressure supply device 100 to the wheel cylinders 40. Referring to FIG. 1, the first hydraulic passage 211 may be provided to connect the first pressure chamber 112 to the first and second hydraulic circuits 201 and 202. The second hydraulic passage 212 may be provided to connect the second pressure chamber 113 to the first and second hydraulic circuits 201 and 202. The first hydraulic passage 211 and the second hydraulic passage 212 may be linked to each other, and may then be branched into a third hydraulic passage 213 communicating with the first hydraulic circuit 201 and a fourth hydraulic passage 214 communicating with the second hydraulic circuit 202.

As a result, hydraulic pressure produced in the first pressure chamber 112 by forward movement of the hydraulic piston 114 may be transmitted to the first hydraulic circuit 201 through the first hydraulic passage 211 and the third hydraulic passage 213, and may be transmitted to the second hydraulic circuit 202 through the first hydraulic passage 211 and the fourth hydraulic passage 214. In addition, hydraulic pressure produced in the second pressure chamber 113 by forward movement of the hydraulic piston 114 may be transmitted to the first hydraulic circuit 201 through the second hydraulic passage 212 and the third hydraulic passage 213, and may be transmitted to the second hydraulic circuit 202 through the second hydraulic passage 212 and the fourth hydraulic passage 214.

A first valve 231 to control flow of a pressing medium may be provided in the first hydraulic passage 211. The first valve 231 may be provided as a check valve that allows the pressing medium to flow from the first pressure chamber 112 to the first and second hydraulic circuits 201 and 202 and prevents the pressing medium from flowing from the first hydraulic circuit 201 to the first and second pressure chambers 201 and 202. That is, the first valve 231 may allow hydraulic pressure produced in the first pressure chamber 112 to flow into the first and second hydraulic circuits 201 and 202, and may prevent a hydraulic pressure produced in the first and second hydraulic circuits 201 and 202 from leaking to the first pressure chamber 112 through the second hydraulic passage 212.

A fifth hydraulic passage 215 may be provided to connect a front end of the first valve 231 on the first hydraulic passage 211 to the second hydraulic passage 212. The fifth hydraulic passage 215 may be provided with a second valve 232 controlling flow of a pressing medium. The second valve 232 may be implemented as a bidirectional valve to control flow of the pressing medium flowing between the first hydraulic passage 211 and the second hydraulic passage 212 through the fifth hydraulic passage 215. The second valve 232 may be implemented as a normally closed (NC) solenoid valve that remains closed in a normal state and is then open upon receiving an electrical signal from the ECU.

The first hydraulic circuit 201 and the second hydraulic circuit 202 of the hydraulic control unit will hereinafter be described with reference to the attached drawings.

The first hydraulic circuit 201 may control hydraulic pressure of the first and second wheel cylinders 41 and 42 installed in two wheels selected from among four wheels RR, RL, FR, and FL, and may control hydraulic pressure of the third and fourth wheel cylinders 43 and 44 installed in the remaining two wheel cylinders other than the selected wheels.

The first hydraulic circuit 201 may receive hydraulic pressure from the hydraulic-pressure supply device 100 through the third hydraulic passage 213, and the third hydraulic passage 212 may be branched into two passages that are respectively connected to the first wheel cylinder 41 and a second wheel cylinder 42. Likewise, the second hydraulic circuit 202 may receive hydraulic pressure from the hydraulic-pressure supply device 100 through the fourth hydraulic passage 214, and the fourth hydraulic passage 214 may be branched into two passage that are respectively connected to the third wheel cylinder 43 and the fourth wheel cylinder 44.

The first and second hydraulic circuits 201 and 202 may include a plurality of inlet valves 221 (221a, 221b, 221c, 221d) to control flow of a pressing medium applied to the first to fourth wheel cylinders 40 and hydraulic pressure of the pressing medium. In more detail, the first hydraulic circuit 201 may include the inlet valves 221a and 221b, and the second hydraulic circuit 202 may include the inlet valves 221c and 221d. The first to fourth inlet valves 221 may be arranged upstream of the first to fourth wheel cylinders 40. The inlet valves 221 may be implemented as normally open (NO) solenoid valves that remain open in a normal state and are then closed upon receiving an electric signal from the ECU.

The first and second hydraulic circuits 201 and 202 may include check valves 223a, 223b, 223c, and 223d connected in parallel to the first to fourth inlet valves 221a, 221b, 221c, and 221d. The check valves 223a, 223b, 223c, and 223d may be provided in bypass passages by which front ends and rear ends of the respective inlet valves 221a, 221b, 221c, and 221d are connected to one another in the first and second hydraulic circuits 201 and 202. The check valves 223a, 223b, 223c, and 223d may allow a pressing medium to flow from the wheel cylinders 40 to the hydraulic-pressure providing unit 110 and may prevent the pressing medium from flowing from the hydraulic-pressure providing unit 110 to the wheel cylinders 40. The first to fourth check valves 223a, 223b, 223c, and 223d may allow hydraulic pressure of the pressing medium applied to the first to fourth wheel cylinders 40 to be rapidly discharged. Alternatively, during abnormal operation of the inlet valves 221a, 221b, 221c, and 221d, the first to fourth check valves 223a, 223b, 223c, and 223d may allow hydraulic pressure of the pressing medium applied to the wheel cylinders 40 to flow into the hydraulic-pressure providing unit 110.

The first hydraulic circuit 201 may include first and second outlet valves 222a and 222b connected to the reservoir 30 so as to improve performance or throughput when braking of the first and second wheel cylinders 41 and 42 is released. The first and second outlet valves 222 may be respectively connected to the first and second wheel cylinders 41 and 42 so as to control flow of the pressing medium discharged from the wheel cylinders 40. That is, the first and second outlet valves 222a and 222b may sense brake pressures of the first and second wheel cylinders 41 and 42. If decompression braking is needed, the first and second outlet valves 222a and 222b may be selectively open to control decompression of the wheel cylinders 40. The first and second outlet valves 222a and 222b may be implemented as normally closed (NC) solenoid valves that remain closed in a normal state and are then open upon receiving an electrical signal from the ECU.

Meanwhile, a second backup passage 252 may be linked to rear ends or downstream sides of the third and fourth inlet valves 221c and 221d for the third and fourth wheel cylinders 43 and 44. The second backup passage 252 may be provided with at least one second cut valve 262 controlling flow of the pressing medium. A detailed description thereof will hereinafter be given.

Meanwhile, a first dump valve 241 may be provided in the first dump passage 116 to control flow of a pressing medium, and a second dump valve 243 may be provided in the second dump passage 117 to control flow of the pressing medium. The first dump valve 241 may be implemented as a check valve that allows the pressing medium to flow from the reservoir 30 to the first pressure chamber 112 and prevents the pressing medium from flowing from the first pressure chambers 112 to the reservoir 30. That is, the first dump valve 241 may allow the pressing medium to flow from the reservoir 30 to the first pressure chamber 112, and may prevent the pressing medium from flowing from the first pressure chambers 112 to the reservoir 30. The second dump valve 243 may be implemented as a check valve that allows the pressing medium to flow from the reservoir 30 to the second pressure chamber 113 and prevents the pressing medium from flowing from the second pressure chamber 113 to the reservoir 30. The second dump valve 243 may allow the pressing medium to flow from the reservoir 30 to the second pressure chamber 113, and may prevent the pressing medium from flowing from the second pressure chamber 113 to the reservoir 30.

The first dump passage 116 may be provided with a bypass passage 118 connected parallel to the first dump valve 241. In more detail, the bypass passage 118 may be provided as a detour (i.e., a bypass route) on the first dump passage 116 such that the bypass passage 118 is connected to the first dump passage 117 by bypassing front and rear ends of the first dump valve 241. The bypass passage 118 may include a third dump valve 242 configured to control flow of a pressing medium between the first pressure chamber 113 and the reservoir 30. The third dump valve 242 may be implemented as a bidirectional valve to control flow of a pressing medium between the first pressure chamber 112 and the reservoir 30. The third dump valve 242 may be implemented as a normally open (NO) solenoid valve that remains open in a normal state and is then closed upon receiving an electrical signal from the ECU.

The hydraulic-pressure providing unit 110 of the electronic brake system 1 according to the embodiment of the present disclosure may operate in a double-acting manner.

In more detail, hydraulic pressure produced in the first pressure chamber 112 by forward movement of the hydraulic piston 114 may be transmitted to the first hydraulic circuit 201 through the first and third hydraulic passages 211 and 213, thereby braking the first and second wheel cylinders 41 and 42. In addition, hydraulic pressure produced in the first pressure chamber 112 by forward movement of the hydraulic piston 114 may be transmitted to the second hydraulic circuit 202 through the first hydraulic passage 211 and the fourth hydraulic passage 214, thereby braking the third and fourth wheel cylinders 43 and 44.

Likewise, hydraulic pressure produced in the second pressure chamber 113 by backward movement of the hydraulic piston 114 may be transmitted to the first hydraulic circuit 201 through the second hydraulic passage 212 and the third hydraulic passage 213, thereby braking the first and second wheel cylinders 41 and 42. In addition, hydraulic pressure produced in the second pressure chamber 113 by backward movement of the hydraulic piston 114 may be transmitted to the second hydraulic circuit 202 through the second hydraulic passage 212 and the fourth hydraulic passage 214, thereby braking the third and fourth wheel cylinders 43 and 44.

Negative pressure produced in the first pressure chamber 112 by backward movement of the hydraulic piston 114 may suction the pressing medium from the first and second wheel cylinders 41 and 42, such that the pressing medium may move back from the first hydraulic circuit 201 to the first pressure chamber 112 through the third hydraulic passage 213, the fifth hydraulic passage 215, and the first hydraulic passage 211. In addition, the negative pressure produced in the first pressure chamber 112 by backward movement of the hydraulic piston 114 may suction the pressing medium from the third and fourth wheel cylinders 43 and 44, such that the pressing medium may move back from the second hydraulic circuit 202 to the first pressure chamber 112 through the fourth hydraulic passage 214, the fifth hydraulic passage 215, and the first hydraulic passage 211.

The electronic brake system 1 according to the embodiment of the present disclosure may include a first backup passage 251 and a second backup passage 252, each of which is configured to directly transmit the pressing medium discharged from the integrated master cylinder 20 to the wheel cylinders during abnormal operation of the electronic brake system 1, resulting in braking of the vehicle. A mode in which hydraulic pressure from the integrated master cylinder 20 can be directly transmitted to the wheel cylinders is referred to as a fallback mode.

The first backup passage 251 may connect the master chamber 21a of the integrated master cylinder 20 to the first hydraulic circuit 201, and the second backup passage 252 may connect the simulation chamber 22a of the integrated master cylinder 20 to the second hydraulic circuit 202. In more detail, the first backup passage 251 may be linked to the rear end of the first or second inlet valve 221a or 221b in the first hydraulic circuit 201. The second backup passage 252 may be branched from the second hydraulic circuit 202, and may then be linked to each of the rear ends of the third and fourth inlet valves 221c and 221d in the second hydraulic circuit 202.

The first backup passage 251 may be provided with the first cut valve 261 controlling flow of the pressing medium, and the second backup passage 252 may be provided with the second cut valve 262 controlling flow of the pressing medium. The first and second cut valves 261 and 262 may be implemented as normally open (NO) solenoid valves that remain open in a normal state and are then closed upon receiving a closing signal from the ECU.

Therefore, hydraulic pressure received from the hydraulic-pressure supply device 100 when the first and second cut valves 261 and 262 are closed may be supplied to the wheel cylinders through the first and second hydraulic circuits 201 and 202. Hydraulic pressure received from the integrated master cylinder 20 when the first and second cut valves 261 and 262 are open may be supplied to the wheel cylinders through the first and second backup passages 251 and 252.

The electronic brake system 1 according to the embodiment of the present disclosure may include a passage pressure sensor PS1 to sense hydraulic pressure of at least one of the first hydraulic circuit 201 and the second hydraulic circuit 202. The passage pressure sensor PS1 may be provided at the front end of the inlet valve 221 of at least one of the first hydraulic circuit 201 and the second hydraulic circuit 202, thereby sensing hydraulic pressure applied to the first hydraulic circuit 201 and hydraulic pressure applied to the second hydraulic circuit 202. Although the drawings have disclosed that the passage pressure sensor PS1 is provided in the first hydraulic circuit 201 and the second hydraulic circuit 202 for convenience of description, the scope or spirit of the present disclosure is not limited thereto, and it should be noted that the number of passage pressure sensors may also be set to 1 or any other number so long as hydraulic pressure applied to each of the hydraulic circuits 201 and 202 can be sensed.

A method for operating the electronic brake system 1 configured to provide brake pressure in a normal operation mode according to the embodiment of the present disclosure will hereinafter be described with reference to the attached drawings.

The electronic brake system 1 may use the hydraulic-pressure supply device 100 in different ways according to a first braking mode and a second braking mode. In the first braking mode, hydraulic pressure produced by the hydraulic-pressure supply device 100 may be primarily provided to the wheel cylinders 40. In the second braking mode, hydraulic pressure produced by the hydraulic-pressure supply device 100 may be secondarily provided to the wheel cylinders 40, resulting in occurrence of higher brake pressure than the first braking mode. The first and second braking modes may be changeable by operating the hydraulic-pressure supply device 100 and the hydraulic control unit 200 in different ways. The hydraulic-pressure supply device 100 may use a first braking mode and a third braking mode, such that the hydraulic-pressure supply device 100 can provide higher hydraulic pressure without increasing an output level of the motor 120, resulting in reduction in unnecessary load applied to the motor 120. As a result, the production cost and weight of the brake system can be reduced and stable brake force can be obtained, resulting in an increase in durability and operational reliability of the brake system.

Figure 2:
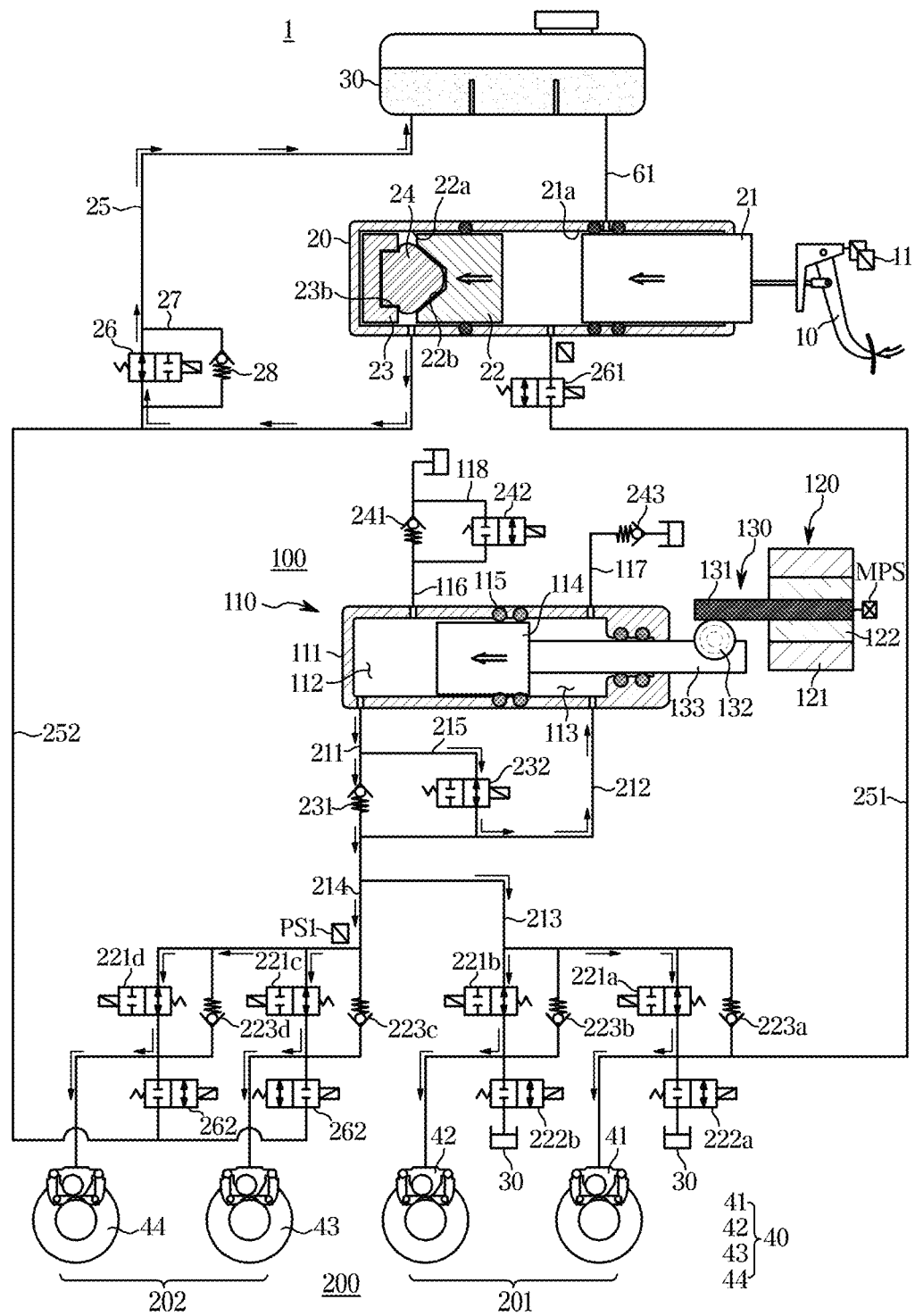
FIG. 2 is a hydraulic circuit diagram illustrating an electronic brake system for performing a first braking mode according to an embodiment of the present disclosure.

FIG. 2 is a hydraulic circuit diagram illustrating a method for operating the electronic brake system 1 configured to perform a first braking mode by forward movement of the hydraulic piston 114 according to an embodiment of the present disclosure.

Referring to FIG. 2, when the driver depresses the brake pedal 10 in the initial braking stage, the motor 120 may rotate in one direction, rotational force of the motor 120 may be transmitted to the hydraulic-pressure providing unit 110 by the power switching unit 130, and the hydraulic piston 114 of the hydraulic-pressure providing unit 110 moves forward, such that hydraulic pressure may occur in the first pressure chamber 112. Hydraulic pressure discharged from the first pressure chamber 112 may be transmitted to the wheel cylinders 40 respectively provided to four wheels through the first hydraulic circuit 201 and the second hydraulic circuit 202, such that braking force occurs in the wheel cylinders 40.

In more detail, hydraulic pressure produced in the first pressure chamber 112 may be primarily transmitted to the wheel cylinders 41 and 42 provided in the first hydraulic circuit 201 after sequentially passing through the first hydraulic passage 211 and the second hydraulic passage 213. Since the first valve 231 provided in the first hydraulic passage 211 may allow flow of the pressing medium discharged from the first pressure chamber 112, the pressing medium can easily flow from the first pressure chamber 112 along the first hydraulic passage 211. In this case, the first and second inlet valves 221a and 221b respectively installed in two passages branched from the first hydraulic circuit 201 may remain open, and the first and second outlet valves 222a and 222b installed in passages branched from two passages branched from the first hydraulic circuit 201 may remain closed, such that hydraulic pressure is prevented from leaking to the reservoir 30.

In addition, hydraulic pressure received from the first pressure chamber 112 may be primarily transmitted to the wheel cylinders 43 and 44 provided in the second hydraulic circuit 202 after sequentially passing through the first hydraulic passage 211 and the fourth hydraulic passage 214. As described above, the first valve 241 provided in the first hydraulic passage 211 may allow flow of the pressing medium discharged from the first pressure chamber 112, so that the pressing medium can easily flow from the first pressure chamber 112 along the first hydraulic passage 211.

In this case, the third and fourth inlet valves 221c and 221d respectively installed in two passages branched from the first hydraulic circuit 202 may remain open. In addition, as will be described later, the second cut valve 262 of the second backup passage 251 may also remain closed in a normal state so that hydraulic pressure received through the third and fourth inlet valves 221c and 221d is prevented from leaking to the second backup passage 252.

In addition, the second valve 232 provided in the fifth hydraulic passage 215 may transition to the open state, so that the fifth hydraulic passage 215 may be open. Therefore, some parts of hydraulic pressure received from the first pressure chamber 112 may be transmitted to the second pressure chamber 113 after sequentially passing through the first hydraulic passage 211, the fifth hydraulic passage 215, and the second hydraulic passage 212. As a result, the first pressure chamber 112 may communicate with the second pressure chamber 113 in a manner that brake pressure of the first pressure chamber 112 is equal to brake pressure of the second pressure chamber 113 through synchronization, resulting in reduction in load applied to the motor 120.

Meanwhile, in the first braking mode, the third dump valve 242 provided in the bypass passage 118 may remain closed in a manner that hydraulic pressure of the pressing medium stored in the first pressure chamber 112 is prevented from leaking to the reservoir 30.

When hydraulic pressure of the pressing medium occurs by the hydraulic-pressure supply device 100, the first and second cut valves 261 and 252 provided in the first and second backup passages 251 and 252 are closed, such that hydraulic pressure discharged from the integrated master cylinder 20 is prevented from flowing into the wheel cylinders 40 and at the same time prevents hydraulic pressure of the pressing medium received from the hydraulic-pressure supply device 100 from flowing into the integrated master cylinder 20.

In more detail, in the normal operation mode, the first cut valve 261 provided in the first backup passage 251 is closed so that the master chamber 21a of the integrated master cylinder 20 is sealed. Therefore, displacement corresponding to a pedal effort applied to the brake pedal 10 may occur in the master piston 21, and may pressurize the pressing medium stored in the master chamber 21a, resulting in occurrence of hydraulic pressure of the pressing medium. Thereafter, hydraulic pressure of the pressing medium stored in the master chamber 21a may be transmitted in a forward direction (e.g., a right side surface when viewed from FIG. 2) of the reaction force piston 22, resulting in formation of displacement in the reaction force piston 22. In the normal operation mode, the simulator valve 26 provided in the simulation passage 25 may be open so that the simulation chamber communicates with the reservoir 30. Accordingly, the elastic member 24 may be compressed by such displacement of the reaction force piston 22, elastic restoring force may occur by such compression of the elastic member 24, the elastic restoring force may act as reaction force corresponding to a pedal effort of the brake pedal 10 depressed by the driver, resulting in formation of proper pedal feel for the driver. In this case, the pressing medium stored in the simulation chamber 22a may be discharged to the reservoir 30 through the simulation passage 25.

Figure 3:
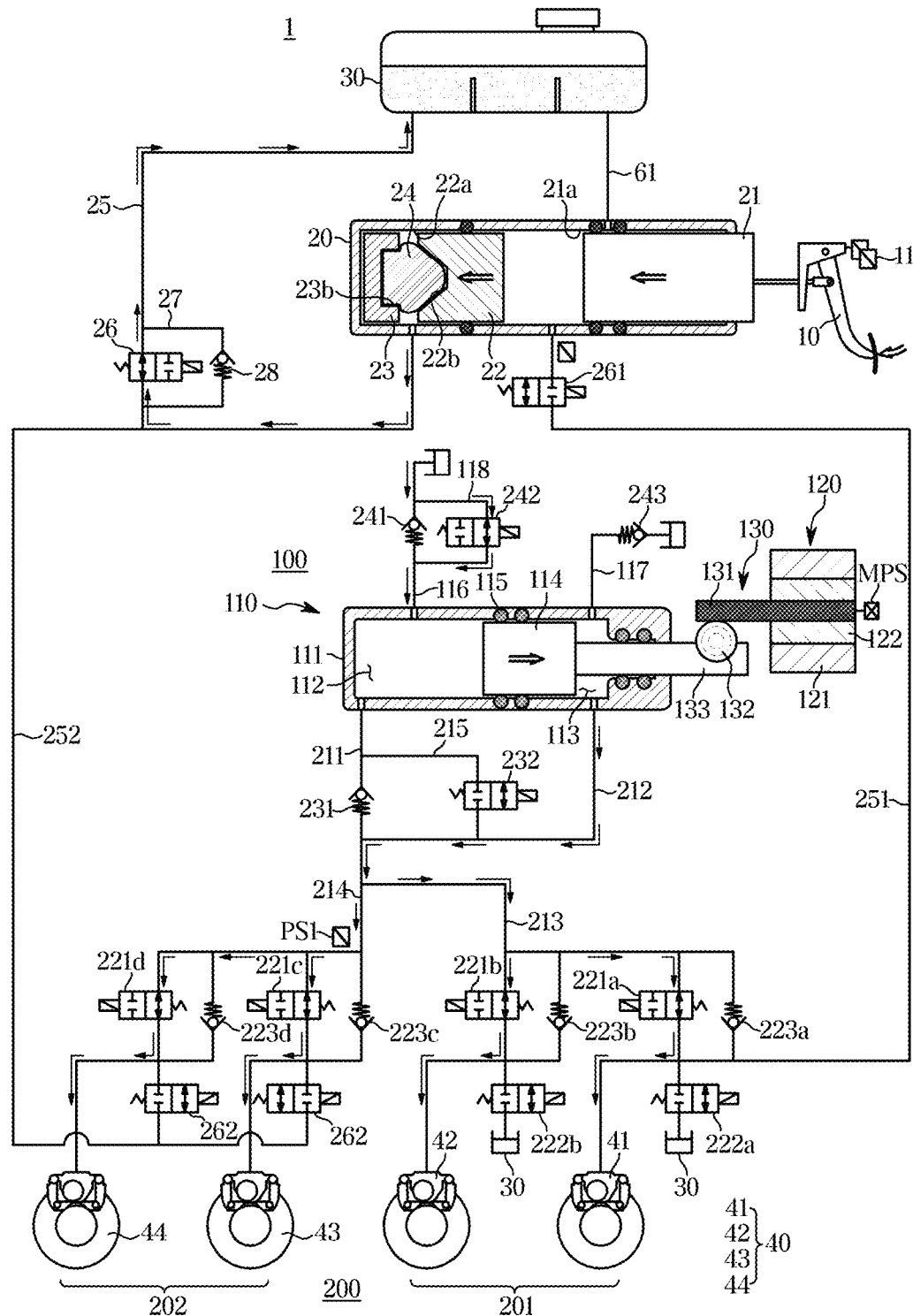
FIG. 3 is a hydraulic circuit diagram illustrating an electronic brake system for performing a second braking mode according to an embodiment of the present disclosure.

In order to generate higher brake pressure than the first braking mode, the electronic brake system 1 according to the embodiment of the present disclosure may switch from the first braking mode to a second braking mode shown in FIG. 3.

FIG. 3 is a hydraulic circuit diagram illustrating a method for operating the electronic brake system 1 configured to perform a second braking mode by backward movement of the hydraulic piston 114 according to an embodiment of the present disclosure.

Referring to FIG. 3, when displacement of the brake pedal 10 sensed by the pedal displacement sensor 11 is higher than a first predetermined displacement level, or when hydraulic pressure sensed by the passage pressure sensor PS1 is higher than a first predetermined pressure level, the ECU may determine that higher brake pressure is required, so that the ECU may switch from the first braking mode to the second braking mode for higher brake pressure.

When the first braking mode transitions to the second braking mode, the motor 120 rotates in another direction, rotational force of the motor 120 is transmitted to the hydraulic-pressure providing unit 110 by the power switching unit 130, and the hydraulic piston 114 of the hydraulic-pressure providing unit 110 moves backward, such that hydraulic pressure may occur in the second pressure chamber 113. Hydraulic pressure discharged from the second pressure chamber 113 may be transmitted to the first to fourth wheel cylinders 40 respectively provided at four wheels through the first hydraulic circuit 201 and the second hydraulic circuit 202, resulting in occurrence of braking force.

In more detail, hydraulic pressure received from the second pressure chamber 113 may be secondarily transmitted to the wheel cylinders 41 and 42 provided in the first hydraulic circuit 201 after sequentially passing through the second hydraulic passage 212 and the third hydraulic passage 213. In this case, the first and second inlet valves 221a and 221b may remain open and the first and second outlet valves 222a and 222b of the first hydraulic circuit may remain closed, such that hydraulic pressure is prevented from leaking to the reservoir 30.

In addition, hydraulic pressure received from the second pressure chamber 113 may be secondarily transmitted to the wheel cylinders 43 and 44 provided in the second hydraulic circuit 202 after sequentially passing through the second hydraulic passage 212 and the fourth hydraulic passage 214. In this case, the third and fourth inlet valves 221c and 221d may remain open and the second cut valve 262 of the second backup passage 251 may remain closed, such that hydraulic pressure is prevented from leaking to the second backup passage 252.

Meanwhile, in the second braking mode, the second valve 232 provided in the fifth hydraulic passage 215 may transition to the closed state so that hydraulic pressure received from the second pressure chamber is prevented from leaking to the first pressure chamber 112 along the fifth hydraulic passage 215, and at the same time the third dump valve 242 provided in the bypass passage 118 that prevents negative pressure caused by backward movement of the hydraulic piston 114 from occurring in the first pressure chamber 112 may transition to the open state.

Operations of the integrated master cylinder 20 and the first and second cut valves 261 and 262 during the second braking mode are identical to those of the first braking mode, and as such a detailed description thereof will herein be omitted to avoid redundant description thereof.

A method for operating the electronic brake system 1 configured to release brake pressure in a normal operation state according to the embodiment of the present disclosure will hereinafter be described with reference to FIG. 4.

Figure 4:
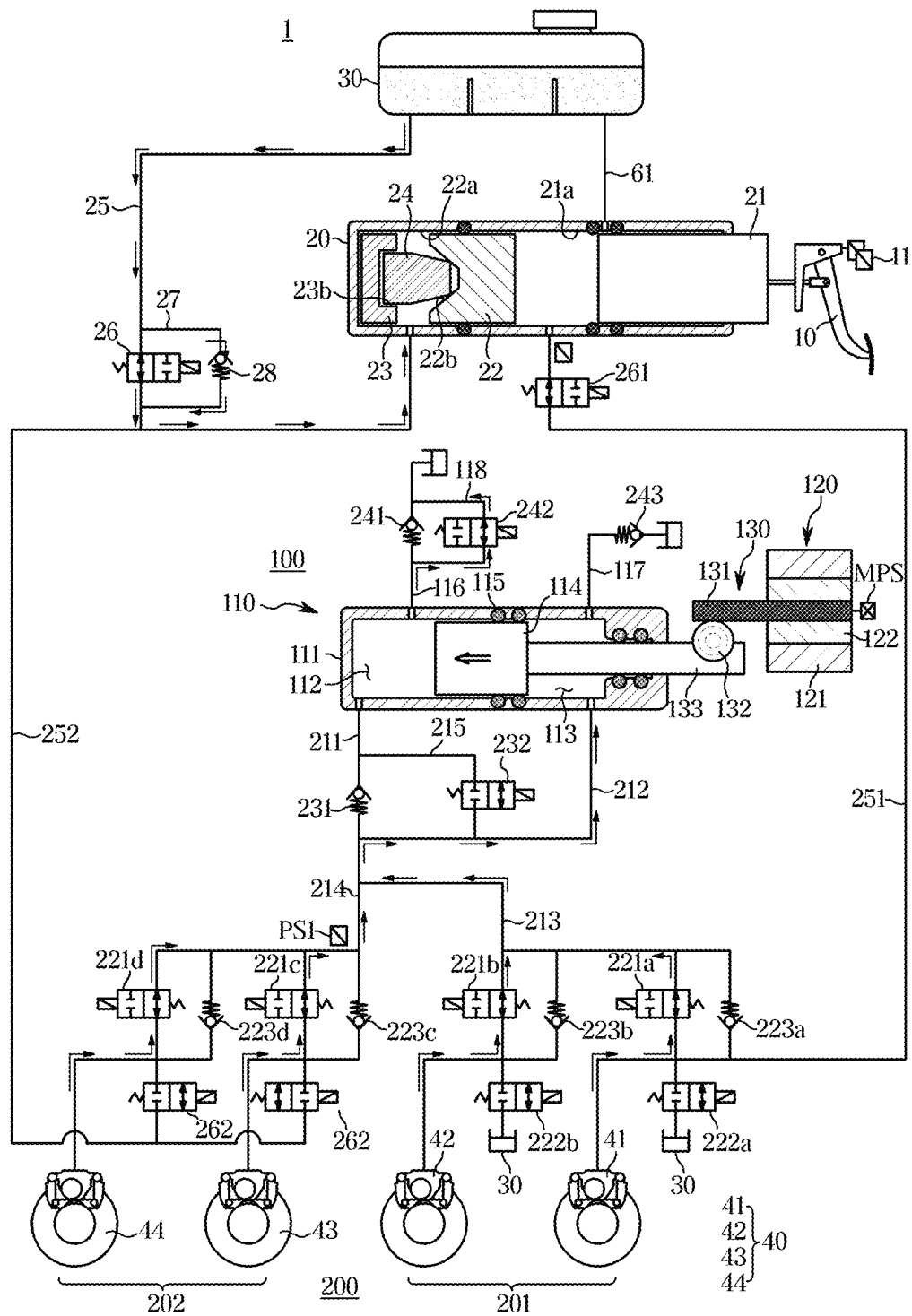
FIG. 4 is a hydraulic circuit diagram illustrating an electronic brake system for releasing a second braking mode according to an embodiment of the present disclosure.

FIG. 4 is a hydraulic circuit diagram illustrating a method for operating the electronic brake system 1 configured to release the second braking mode by forward movement of the hydraulic piston 114 according to an embodiment of the present disclosure.

Referring to FIG. 4, if there is a need to release the second braking mode, the motor 120 rotates in one direction to transmit rotational force to the power switching unit 130, and the hydraulic piston 114 moves forward by a worm shaft 131, a worm wheel 132, and a drive shaft 133 of the power switching unit 130. Thus, negative pressure may occur in the second pressure chamber 113. As a result, the pressing medium discharged from the wheel cylinders may be transmitted to the second pressure chamber 113 through the first and second hydraulic circuits 201 and 202.

In more detail, the pressing medium applied to the first and second wheel cylinders 41 and 42 of the first hydraulic circuit 201 by negative pressure produced in the second pressure chamber 113 sequentially passes through the third hydraulic passage 213 and the second hydraulic passage 212, and is then applied to the second pressure chamber 113. In this case, the first and second inlet valves 221a and 221b respectively installed in two passages branched from the first hydraulic circuit 201 may remain open, and the first and second outlet valves 222a and 222b installed in passages that are respectively branched from two passages branched from the first hydraulic circuit 201 may remain closed, such that hydraulic pressure of the pressing medium stored in the reservoir 30 is prevented from leaking to the second pressure chamber 113.

In addition, the pressing medium applied to the third and fourth wheel cylinders 43 and 44 of the second hydraulic circuit 202 by negative pressure produced in the second pressure chamber 113 sequentially passes through the fourth hydraulic passage 214 and the second hydraulic passage 212, and is then applied to the second pressure chamber 113. In this case, the third and fourth inlet valves 221a and 221b respectively installed in two passages branched from the second hydraulic circuit 202 may remain open, and the second cut valve 262 of the second backup passage 215 may remain closed, such that hydraulic pressure of the pressing medium flowing in the second backup passage 252 is prevented from leaking to the second pressure chamber 113.

In this case, the second valve 232 provided in the fifth hydraulic passage 215 may remain closed, thereby preventing the pressing medium stored in the first pressure chamber 112 from flowing into the first hydraulic passage 211 and the fifth hydraulic passage 215 by forward movement of the hydraulic piston 114. The third dump valve 242 provided in the bypass passage 118 may transition to the open state, such that hydraulic pressure produced in the first pressure chamber 112 can be discharged to the reservoir 30 along the bypass passage 118. As a result, the hydraulic piston 114 can easily move forward and negative pressure can stably occur in the second pressure chamber 113.

Figure 5:
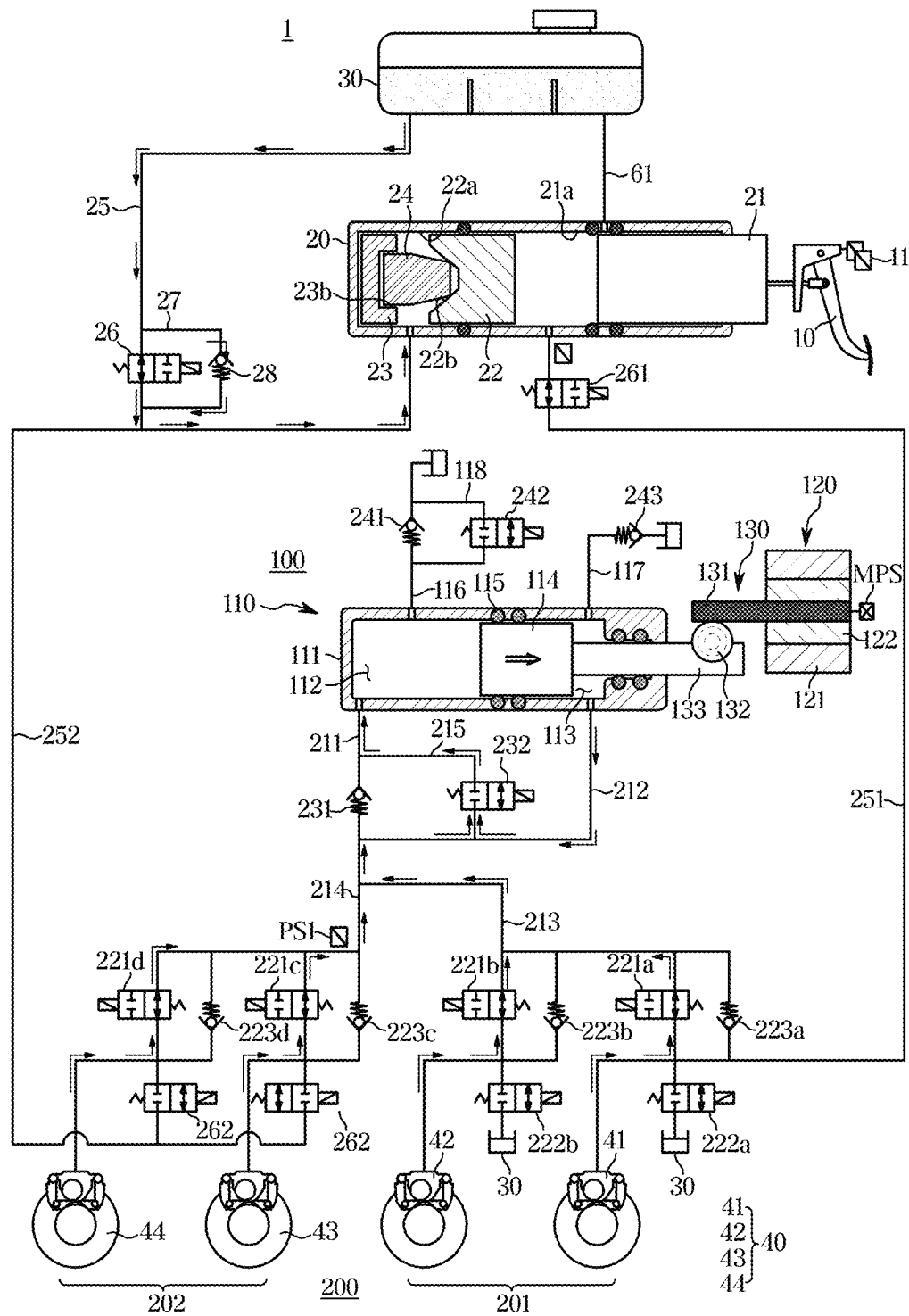
FIG. 5 is a hydraulic circuit diagram illustrating an electronic brake system for releasing a first braking mode according to an embodiment of the present disclosure.

In order to completely release brake pressure of the wheel cylinders 40 after releasing the second braking mode shown in FIG. 4, the electronic brake system 1 may transition to a release mode of releasing the first braking mode shown in FIG. 5.

FIG. 5 is a hydraulic circuit diagram illustrating a method for operating the electronic brake system 1 configured to release the first braking mode by backward movement of the hydraulic piston 114 according to an embodiment of the present disclosure.

Referring to FIG. 5, when a pedal effort applied to the brake pedal 10 is released (removed), the motor 120 rotates in another direction such that rotational force is transmitted from the motor 120 to the power switching unit 130, and the hydraulic piston 114 moves backward by a worm shaft 131, a worm wheel 132, and a drive shaft 133 of the power switching unit 130. Accordingly, hydraulic pressure of the first pressure chamber 112 is released (removed) and negative pressure occurs, and at the same time the pressing medium discharged from the wheel cylinders may be transmitted to the first pressure chamber 112 through the first and second hydraulic circuits 201 and 202.

In more detail, the pressing medium applied to the first and second wheel cylinders 41 and 42 of the first hydraulic circuit 201 by negative pressure produced in the first pressure chamber 112 sequentially passes through the third hydraulic passage 213, the fifth hydraulic passage 215, and the first hydraulic passage 211, and is then applied to the first pressure chamber 112. To this end, the second valve 232 provided in the fifth hydraulic passage 215 may transition to the open state, the first and second inlet valves 221a and 221b respectively installed in two passages branched from the first hydraulic circuit 201 may remain open, and the first and second outlet valves 222a and 222b installed in passages that are respectively branched from two passages branched from the first hydraulic circuit 201 may remain closed, such that hydraulic pressure of the pressing medium stored in the reservoir 30 is prevented from leaking to the first pressure chamber 112.

In addition, the pressing medium applied to the third and fourth wheel cylinders 43 and 44 of the second hydraulic circuit 202 by negative pressure produced in the first pressure chamber 112 sequentially passes through the fourth hydraulic passage 214, the fifth hydraulic passage 215, and the first hydraulic passage 211, and is then applied to the first pressure chamber 112. In this case, the third and fourth inlet valves 221a and 221b respectively installed in two passages branched from the second hydraulic circuit 202 may remain open, and the second cut valve 262 of the second backup passage 215 may remain closed, such that hydraulic pressure of the pressing medium flowing in the second backup passage 252 is prevented from leaking to the first pressure chamber 112.

In addition, hydraulic pressure produced in the second pressure chamber 113 by backward movement of the hydraulic piston 114 sequentially passes the second hydraulic passage 212, the fifth hydraulic passage 215, and the first hydraulic passage 211, and is then transmitted to the first pressure chamber 112, such that the hydraulic piston 114 can easily move backward. The third dump valve 242 provided in the bypass passage 118 may transition to the closed state so that negative pressure may stably occur in the first pressure chamber 112.

A method for operating the electronic brake system 1 in an abnormal operation mode (i.e., a fallback mode) according to the embodiment of the present disclosure will hereinafter be described with reference to the FIG. 6.

Figure 6:
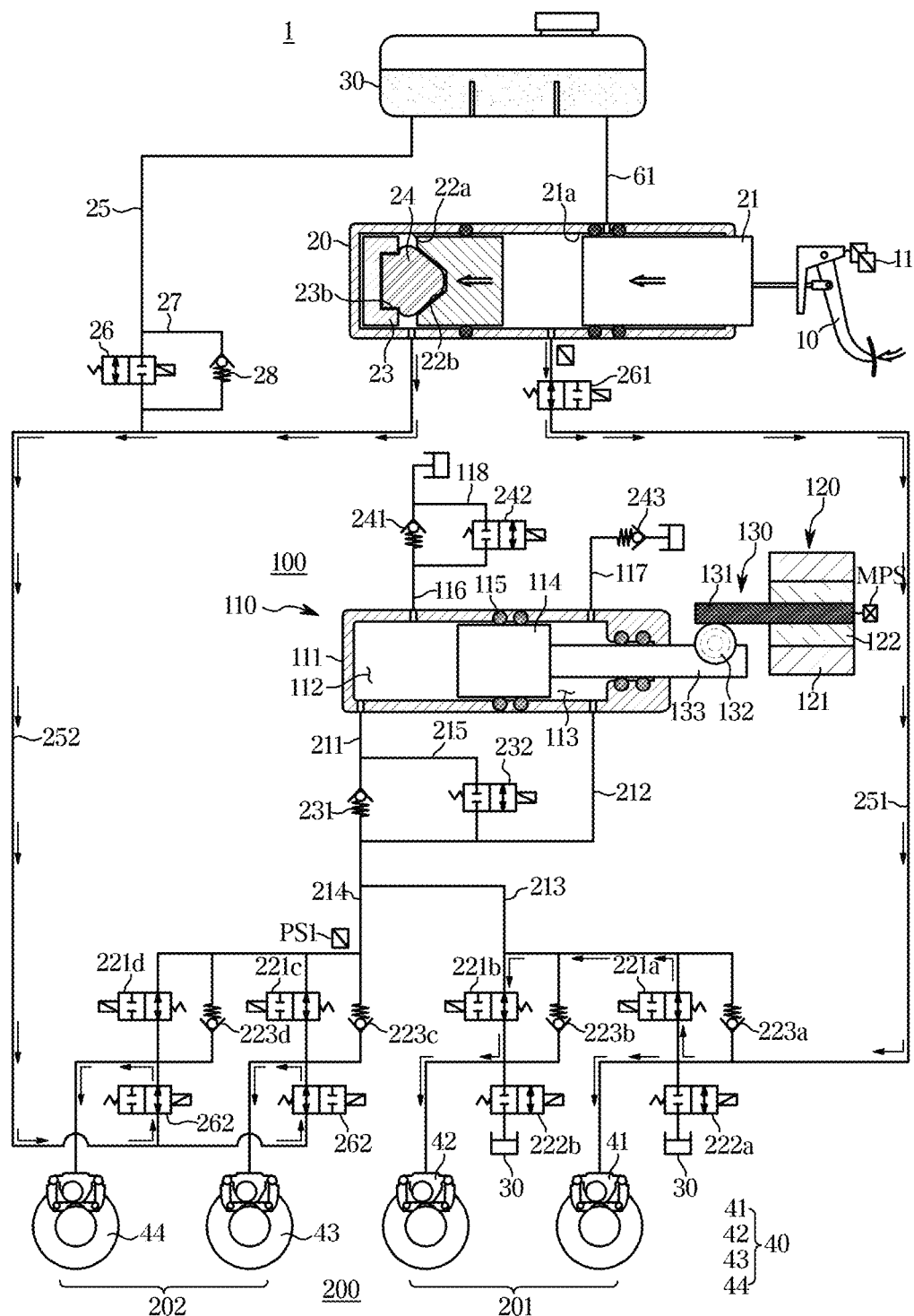
FIG. 6 is a hydraulic circuit diagram illustrating an electronic brake system for performing an abnormal operation mode (fallback mode) according to an embodiment of the present disclosure.

FIG. 6 is a hydraulic circuit diagram illustrating a method for operating the electronic brake system 1 in an abnormal operation mode (i.e., a fallback mode) according to the embodiment of the present disclosure.

Referring to FIG. 6, the fallback mode may be enabled or activated when it is impossible for the electronic brake system 1 to normally operate due to occurrence of a system failure or any other errors. In the fallback mode, the electronic brake system 1 may be controlled in a manner that respective valves thereof are controlled to return to the initial braking stage in which the valves do not operate (i.e., a non-operation state).

Thereafter, once the driver depresses the brake pedal 10, the master piston 21 connected to the brake pedal 10 moves forward, resulting in formation of displacement. In the non-operation state, the first cut valve 261 may remain open, such that the pressing medium stored in the master chamber 21a by forward movement of the master piston 21 may be transmitted to the first and second wheel cylinders 41 and 42 of the first hydraulic circuit 201 along the first backup passage 251, resulting in braking of the vehicle.

In addition, the pressing medium pressurized in the master chamber 21a may allow the reaction force piston 22 to move backward, such that the pressing medium stored in the simulation chamber 22a may be transmitted to the third and fourth wheel cylinders 43 and 44 of the second hydraulic circuit 202 along the second backup passage 252, resulting in braking of the vehicle. In this case, the simulator valve 26 may remain closed in the non-operation state, such that the pressing medium received from the first simulation chamber 22a is not discharged to the reservoir 30.

The elastic member 24 may be compressed by displacement of the reaction force piston 22, elastic restoring force may occur by such compression of the elastic member 24, and the elastic restoring force may act as reaction force corresponding to a pedal effort of the brake pedal 10 depressed by the driver, resulting in formation of proper pedal feel for the driver. As a result, the integrated master cylinder 20 according to the embodiments of the present disclosure may provide a constant pedal effort to the driver who depresses the brake pedal not only in the normal operation mode but also in the fallback mode, resulting in formation of proper pedal feel for the driver.

The first to fourth inlet valves 221 provided in the first and second hydraulic circuits 201 and 202 may remain open in a normal state, such that hydraulic pressure produced in the master chamber 21a and the simulation chamber 22a of the integrated master cylinder 20 can be immediately transmitted to four wheel cylinders 40, such that braking stability is improved and rapid braking is carried out.

As is apparent from the above description, the electronic brake system and the method for operating the same according to the embodiments of the present disclosure may reduce the number of constituent components by implementing an integrated master cylinder, resulting in implementation of a product having a smaller size and a light weight.

The electronic brake system and the method for operating the same according to the embodiments of the present disclosure may efficiently brake a vehicle in various driving situations.

The electronic brake system and the method for operating the same according to the embodiments of the present disclosure may stably generate high brake pressure.

The electronic brake system and the method for operating the same according to the embodiments of the present disclosure may improve performance and operational stability of a product.

The electronic brake system and the method for operating the same according to the embodiments of the present disclosure may provide stable brake pressure in a failure or abnormal state of constituent components or in a leakage state of a pressing medium.

The electronic brake system and the method for operating the same according to the embodiments of the present disclosure may improve durability of a product by reducing load applied to constituent components of the product.

The electronic brake system and the method for operating the same according to the embodiments of the present disclosure may improve ease of assembly and productivity of a product, resulting in reduction in product costs.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An electronic brake system comprising:
a reservoir configured to store a pressing medium therein;
an integrated master cylinder configured to include a master chamber, a master piston provided in the master chamber to produce displacement changeable by operation of a brake pedal, a simulation chamber, a reaction force piston provided in the simulation chamber to produce displacement changeable by hydraulic pressure of pressing medium stored in the master chamber, and an elastic member elastically supporting a reaction force spring;
a hydraulic-pressure supply device configured to generate hydraulic pressure by operating a hydraulic piston by an electrical signal that is output in response to displacement of the brake pedal; and
a hydraulic control unit configured to include a first hydraulic circuit to control hydraulic pressure applied to two wheel cylinders of a plurality of wheel cylinders, and a second hydraulic circuit to control hydraulic pressure applied to two other wheel cylinders of the plurality of wheel cylinders,
wherein the integrated master cylinder further includes:
a simulation passage connecting the simulation chamber and the reservoir to each other;
a simulator valve provided in the simulation passage to control flow of pressing medium through the simulation passage;
a bypass passage connected parallel to the simulator valve on the simulation passage; and
a simulator check valve provided in the bypass passage so as to allow pressing medium to flow in only one direction from the reservoir to the simulation chamber.

2. The electronic brake system according to claim 1, wherein the integrated master cylinder further includes:
a cylinder body in which the master chamber and the simulation chamber are located,
wherein the master chamber and the simulation chamber are sequentially disposed in a direction from an inlet of the cylinder body connected to the brake pedal to an inner end of the cylinder body.

3. The electronic brake system according to claim 2, wherein the integrated master cylinder further includes:
a support member provided at an inner end of the cylinder body so as to support the elastic member.

4. The electronic brake system according to claim 3, wherein each of the reaction force piston and the support member includes a receiving groove formed to be recessed in a manner that at least some parts of the elastic member are seated therein.

5. The electronic brake system according to claim 1, further comprising:
a first backup passage configured to connect the master chamber to the first hydraulic circuit;
a second backup passage configured to connect the simulation chamber to the second hydraulic circuit;
a first cut valve provided in the first backup passage so as to control flow of a-pressing medium through the first backup passage; and
at least one second cut valve provided in the second backup passage so as to control flow of a-pressing medium through the second backup passage.

6. The electronic brake system according to claim 5, wherein:
the hydraulic-pressure supply device includes:
a first pressure chamber provided at one side of the hydraulic piston movably disposed in a cylinder block and connected to at least one wheel cylinder of the plurality of wheel cylinders; and
a second pressure chamber provided at another side of the hydraulic piston and connected to at least one other wheel cylinder of the plurality of wheel cylinders, and
the hydraulic control unit includes:
a first hydraulic passage connected to the first pressure chamber,
a second hydraulic passage connected to the second pressure chamber, and
a third hydraulic passage through which the first hydraulic passage and the second hydraulic passage are linked to each other and then branched into a plurality of passages to be respectively connected to the first hydraulic circuit and the second hydraulic circuit.

7. An electronic brake system comprising:
a reservoir configured to store a pressing medium therein;
an integrated master cylinder configured to include a master chamber, a master piston provided in the master chamber to produce displacement changeable by operation of a brake pedal, a simulation chamber, a reaction force piston provided in the simulation chamber to produce displacement changeable by hydraulic pressure of pressing medium stored in the master chamber, and an elastic member elastically supporting a reaction force spring;
a hydraulic-pressure supply device configured to generate hydraulic pressure by operating a hydraulic piston by an electrical signal that is output in response to displacement of the brake pedal; and
a hydraulic control unit configured to include a first hydraulic circuit to control hydraulic pressure applied to two wheel cylinders of a plurality of wheel cylinders, and a second hydraulic circuit to control hydraulic pressure applied to two other wheel cylinders of the plurality of wheel cylinders,
wherein the integrated master cylinder includes:
a simulation passage configured to connect the simulation chamber and the reservoir to each other; and
a simulator valve provided in the simulation passage to control flow of pressing medium through the simulation passage,
wherein the electronic brake system further comprises:
a first backup passage configured to connect the master chamber to the first hydraulic circuit;
a second backup passage configured to connect the simulation chamber to the second hydraulic circuit;
a first cut valve provided in the first backup passage so as to control flow of pressing medium through the first backup passage; and
at least one second cut valve provided in the second backup passage so as to control flow of pressing medium through the second backup passage,
wherein:
the hydraulic-pressure supply device includes:
a first pressure chamber provided at one side of the hydraulic piston movably disposed in a cylinder block and connected to at least one wheel cylinder of the plurality of wheel cylinders; and a second pressure chamber provided at another side of the hydraulic piston and connected to at least one other wheel cylinder of the plurality of wheel cylinders, and the hydraulic control unit includes:
a first hydraulic passage connected to the first pressure chamber,
a second hydraulic passage connected to the second pressure chamber, and
a third hydraulic passage through which the first hydraulic passage and the second hydraulic passage are linked to each other and then branched into a plurality of passages to be respectively connected to the first hydraulic circuit and the second hydraulic circuit, and wherein the hydraulic control unit further comprises:
a first valve provided in the first hydraulic passage so as to control flow of pressing medium through the first hydraulic passage;
a fifth hydraulic passage branched from a position between the first pressure chamber and the first valve on the first hydraulic passage, and connected to the second hydraulic passage; and
a second valve provided in the fifth hydraulic passage to control flow of pressing medium through the fifth hydraulic passage.

8. The electronic brake system according to claim 7, wherein:
the first valve is provided as a check valve only the flow of pressing medium such that pressing medium is discharged from the first pressure chamber through the first hydraulic passage; and
the second valve is provided as a solenoid valve controlling bidirectional flow of pressing medium through the fifth hydraulic passage.

9. The electronic brake system according to claim 8, further comprising:
a pedal displacement sensor configured to sense displacement of the brake pedal; and
an electronic control unit (ECU) configured to control operation of one or more of the simulator valve, the first and second cut valve, and the second valve based on hydraulic pressure information and displacement information of the brake pedal.

10. The electronic brake system according to claim 1, wherein: the first hydraulic circuit includes:
a first inlet valve and a second inlet valve configured to respectively control hydraulic pressure supplied to a first wheel cylinder of the plurality of wheel cylinders and hydraulic pressure applied to a second wheel cylinder of the plurality of wheel cylinders; and a first outlet valve and a second outlet valve configured to respectively control hydraulic pressure flowing from the first wheel cylinder to the reservoir and hydraulic pressure flowing from the second wheel cylinder to the reservoir, wherein the second hydraulic circuit includes a third inlet valve and a fourth inlet valve configured to respectively control hydraulic pressure supplied to a third wheel cylinder of the plurality of wheel cylinders and hydraulic pressure supplied to a fourth wheel cylinder of the plurality of wheel cylinders, and the second backup passage is provided to connect at least one of downstream sides of the third and fourth inlet valves to the simulation chamber.

11. The electronic brake system according to claim 10, wherein the simulation passage is provided to be branched from a position between the simulation chamber and the at least one second cut valve on the second backup passage.

12. The electronic brake system according to claim 5, further comprising an electronic control unit (ECU) configured to control to:
perform a normal operation mode,
wherein the normal operation mode includes
sealing the master chamber by closing the first cut valve, and
allowing the simulation chamber to communicate with the reservoir by closing the at least one second cut valve and opening the simulator valve,
whereby the reaction force piston compresses the elastic member by operation of the brake pedal and elastic restoring force of the elastic member is provided for better pedal feel of a driver.

13. The electronic brake system according to claim 5, further comprising an electronic control unit (ECU) configured to control to:
perform an abnormal operation mode,
wherein the abnormal operation mode includes
opening the first cut valve to allow the master chamber to communicate with the first hydraulic circuit, and
allowing the simulation chamber to communicate with the second hydraulic circuit by closing the simulator valve and opening the second cut valve,
whereby the pressing medium stored in the master chamber is provided to the first hydraulic circuit through the first backup passage according to a pedal effort of the brake pedal, and pressing medium of the simulation chamber is provided to the second hydraulic circuit through the second backup passage.

* * * * *